US009729957B1

(12) United States Patent
Kaller et al.

(10) Patent No.: US 9,729,957 B1
(45) Date of Patent: Aug. 8, 2017

(54) DYNAMIC FREQUENCY-DEPENDENT SIDETONE GENERATION

(71) Applicant: Cirrus Logic International Semiconductor Ltd., Edinburgh (GB)

(72) Inventors: Roy Scott Kaller, Austin, TX (US); Jon Hendrix, Wimberley, TX (US); Anthony Shilton, Northcote (AU); Tom Harvey, Northcote (AU); Sam Waters, Gilbert, AZ (US)

(73) Assignee: CIRRUS LOGIC, INC., Austin, TX (US)

( * ) Notice: Subject to any disclaimer, the term of this patent is extended or adjusted under 35 U.S.C. 154(b) by 0 days.

(21) Appl. No.: 15/005,974

(22) Filed: Jan. 25, 2016

(51) Int. Cl.
*H04R 1/10* (2006.01)
*H04R 3/04* (2006.01)
(Continued)

(52) U.S. Cl.
CPC ............ *H04R 1/1041* (2013.01); *G10L 15/22* (2013.01); *H04R 3/04* (2013.01); *G10L 2015/225* (2013.01); *H04M 1/03* (2013.01); *H04M 2201/40* (2013.01); *H04M 2201/41* (2013.01); *H04R 2460/05* (2013.01); *H04W 88/02* (2013.01)

(58) Field of Classification Search
CPC ..... G10L 15/22; G10L 2015/225; H04R 3/04; H04R 2460/05; H04M 1/03; H04M 2201/40; H04M 2201/41; H04W 88/02
See application file for complete search history.

(56) References Cited

U.S. PATENT DOCUMENTS 5,313,555 A 5/1994 Kamiya
5,361,324 A 11/1994 Takizawa et al.
(Continued)

FOREIGN PATENT DOCUMENTS

EP 2362678 A1 8/2011

OTHER PUBLICATIONS

Combined Search and Examination Report mailed Jul. 25, 2016 during prosecution of related GB Application No. 1603392.0.
(Continued)

*Primary Examiner* — Brenda Bernardi
(74) *Attorney, Agent, or Firm* — Norton Rose Fulbright US LLP

(57) ABSTRACT

The overall performance and power utilization of an audio device may be improved with an adaptive sidetone generation system that generates sidetones optimized for different application-specific problems. In particular, systems that include sidetone generation capabilities may be developed to include numerous microphones from which information may be received and processed to generate optimized sidetones. For example, the information from the microphones may be used to receive and/or determine the audio device's operating mode. The information from the microphones and the received and/or determined mode may then be used to generate a sidetone that is optimized for the particular mode and particular conditions in which the audio device is operating. Through the generation of optimized sidetones, the audio signal quality may be improved, thus reducing the amount of subsequent audio processing required, and resulting in improved performance and power utilization.

26 Claims, 7 Drawing Sheets

(51) Int. Cl.
*G10L 15/22* (2006.01)
*H04W 88/02* (2009.01)
*H04M 1/03* (2006.01)

(56) References Cited

U.S. PATENT DOCUMENTS

| | | | |
|---|---|---|---|
| 5,742,928 | A | 4/1998 | Suzuki |
| 5,758,022 | A | 5/1998 | Trompf et al. |
| 8,019,050 | B2 | 9/2011 | Mactavish et al. |
| 8,290,537 | B2 | 10/2012 | Lee et al. |
| 8,363,820 | B1 | 1/2013 | Graham |
| 8,379,884 | B2 | 2/2013 | Horibe et al. |
| 2011/0206217 | A1* | 8/2011 | Weis .................. H04M 1/6066 381/74 |
| 2014/0349638 | A1* | 11/2014 | Umezawa ............. H04M 9/082 455/419 |
| 2015/0256660 | A1 | 9/2015 | Kaller et al. |

OTHER PUBLICATIONS

Furui, Sadaoki "Cepstral Analysis Technique for Automatic Speaker Verification", IEEE Trans on ASSP, vol. 29, No. 2, Apr. 1981.

Junqua, Jean-Claude "The Lombard reflex and its role on human listeners and automatic speech recognizers", Journal of Acoustical Society of America, 93 (1), Jan. 1993.

Chi, Sang-Mun and Oh, Yung-Hwan, "Lombard effect compensation and noise suppression for Lombard speech recognition", Korea Advanced Institute of Science and Technology, Spoken Language, ICSLP96, Proceedings (4) 1996.

Afify et al., "A General Joint Additive and Convolutive Bias Compensation Approach Applied to Noisy Lombard Speech Recognition", IEEE Transactions on Speech and Audio Processing, vol. 6, No. 6, Nov. 1998.

Garnier et al., "Influence of Sound Immersion and Communicative Interaction on the Lombard Effect", Journal of Speech, Language and Hearing Research, vol. 53. pp. 588-608, Jun. 2010.

Vlaj, Damjan and Kacic, Zdravko "The Influence of Lombard Effect on Speech Recognition", Speech Technologies, Ch. 7, Jun. 2011.

Therrien et al., "Sensory Attenuation of Self-Produced Feedback: The Lombard Effect Revisted", (2012); PLoS One 7(11).

Byrne, David C "Dissertation—Influence of ear canal occlusion and air-conducted feedback on speech production in noise", University of Pittsburgh 2013.

\* cited by examiner

DYNAMIC FREQUENCY-DEPENDENT SIDETONE GENERATION

CROSS REFERENCE TO RELATED APPLICATIONS

This application is related to subject matter disclosed in U.S. patent Ser. No. 14/197,814 to Kaller et al. filed on Mar. 5, 2014 and entitled "Frequency-dependent sidetone calibration," which is published as U.S. Patent Application Publication No. 2015/0256660, and which is hereby incorporated by reference.

FIELD OF THE DISCLOSURE

The instant disclosure relates to personal audio devices. More specifically, portions of this disclosure relate to frequency-dependent sidetone generation in personal audio devices.

BACKGROUND

Audio devices, such as mobile/cellular telephones, in which users need to hear their own voice during use, are increasing in prevalence. Audio of a user's own voice can be injected into a speaker output being provided to a user. Such audio can be referred to as a sidetone. Sidetones are presented such that the user's voice is heard by the user in the headphones or other speaker as if the speaker and housing were not covering the ear. For example, due to the obstruction provided by the speaker and housing, one or both ears may be partially or totally blocked, which can result in distortion and attenuation of the user's voice in the ambient acoustic environment. These effects are usually termed occlusion effects because they can result from occlusion of an ear, such as by a headphone, earphone, earbud, and the like. Sidetones have been used to at least partially remedy the occlusion problem. However, conventional sidetones do not always provide a natural sound, especially under changing conditions, such as with changes in the speaker type or position or changes in the environment.

To illustrate the current state of the art, FIG. 1 provides an example schematic block diagram illustrating a conventional sidetone generation system according to the prior art. One drawback of the system of FIG. 1 is that the sidetone generation path is fixed. Thus, the generation of sidetones cannot be adapted to have different characteristics for different applications Shortcomings mentioned here are only representative and are included simply to highlight that a need exists for improved electrical components, particularly for sidetone generation systems employed in personal audio devices, such as mobile phones. Embodiments described herein address certain shortcomings but not necessarily each and every one described here or known in the art.

SUMMARY

The overall performance and power utilization of an audio device may be improved with an adaptive sidetone generation system that generates sidetones selected for different application-specific problems. In particular, systems that include sidetone generation capabilities may include numerous microphones from which information may be received and processed to generate sidetones. The information from the microphones may be used to receive and/or determine the audio device's operating mode. The information from the microphones and the received and/or determined mode may then be used to generate a sidetone for the particular mode and particular conditions in which the audio device is operating. Through the dynamic generation of sidetones, rather than the conventional fixed sidetones, the audio signal quality may be improved, thus reducing the amount of subsequent audio processing required, and resulting in improved performance, improved power utilization, and improved user experience.

According to one embodiment, an apparatus may include a first microphone configured to generate a first microphone signal; a second microphone configured to generate a second microphone signal; a sidetone circuit configured to perform steps comprising: receiving a mode of operation of a user device; and generating a sidetone signal based, at least in part, on the first microphone signal and the second microphone signal and the received mode of operation; and/or a transducer for reproducing an audio signal and the sidetone signal.

In certain embodiments, the first microphone is configured to receive speech input, and the sidetone circuit is configured to generate the sidetone signal by mixing a combination of the first microphone signal and the second microphone signal to recover high frequencies in the received speech input. In addition, in some embodiments, the sidetone circuit is further configured: to detect speech based on at least one of the first microphone signal and the second microphone signal; and/or to determine the mode of operation is a phone call mode when speech is detected. According to an embodiment, the received mode of operation includes at least one of Phone Call, Speaker Recognition, and Automatic Speech Recognition.

In another embodiment, the sidetone circuit is configured to generate the sidetone to improve voice characteristics including at least one of louder speech and enhanced signal-to-noise when the received mode of operation is phone call. The sidetone circuit may also be configured to cancel bone conducted speech in an output of the transducer when the mode of operation is phone call. The sidetone circuit may also be configured to generate the sidetone based, at least in part, on an automatic speech recognition (ASR) algorithm when no speech is detected and the audio signal is generated by an audio playback application; and/or otherwise, generate the sidetone based, at least in part, on a speaker recognition (SR) algorithm when no speech is detected.

According to an embodiment, the first microphone is configured to receive speech input, the second microphone is configured to receive in-ear audio, and the sidetone circuit is further configured to: compare a frequency response of speech captured by the first microphone and the second microphone; track the compared frequency response over a period of time; and/or apply a compensation filter to minimize a difference of the frequency response of speech captured by the first microphone and the second microphone.

In some embodiments, the sidetone circuit is further configured to compensate for an occlusion effect, such as by processing sound to match a frequency response of the transducer to simulate a frequency response of an open ear. The sidetone circuit may also be configured to cancel low frequency air conducted speech.

According to another embodiment, a method for frequency-dependent sidetone generation in personal audio devices may include receiving a first microphone signal from a first microphone; receiving a second microphone signal from a second microphone; receiving a mode of operation of a user device; and/or generating a sidetone signal based, at least in part, on the first microphone signal and the second microphone signal and the received mode of operation. In addition, in some embodiments, the method may also include reproducing, at a transducer, a combination of an audio signal and the sidetone signal.

In certain embodiments, receiving the first microphone signal includes receiving speech input, and generating the sidetone signal includes mixing a combination of the first microphone signal and the second microphone signal to recover high frequencies in the received speech input. In addition, in some embodiments, the step of receiving the mode of operation includes detecting speech based on at least one of the first microphone signal and the second microphone signal; and/or determining the mode of operation is a phone call mode when speech is detected. According to an embodiment, the received mode of operation includes at least one of Phone Call, Speaker Recognition, and Speech Recognition.

In another embodiment, the method may include generating the sidetone to improve voice characteristics including at least one of louder speech and enhanced signal-to-noise when the received mode of operation is phone call. The method may further include cancelling bone-conducted speech when the mode of operation is Phone Call. The method may also include at least one of: generating the sidetone based, at least in part, on a speaker recognition (SR) algorithm when no speech is detected; and/or generating the sidetone based, at least in part, on an automatic speech recognition (ASR) algorithm when no speech is detected and the audio signal is generated by an audio playback application.

According to an embodiment, the first microphone signal includes speech input, the second microphone signal includes in-ear audio, and the method further includes comparing a frequency response of speech captured by the first microphone and the second microphone; tracking the compared frequency response over a period of time; and/or applying a compensation filter to minimize a difference of the frequency response of speech captured by the first microphone and the second microphone.

In some embodiments, the method may include generating the sidetone to compensate for an occlusion effect. The step of compensating for an occlusion effect may include processing sound to match a frequency response of the transducer to simulate a frequency response of an open ear.

According to yet another embodiment, an apparatus includes a controller configured to perform the steps including: receiving a first microphone signal from a first microphone; receiving a second microphone signal from a second microphone; determining a mode of operation of a user device; and/or generating a sidetone signal based, at least in part, on the first microphone signal and the second microphone signal and the determined mode of operation. In addition, the controller may be further configured to perform the step of causing reproduction, at a transducer, of a combination of an audio signal and the sidetone signal.

In certain embodiments, receiving the first microphone signal includes receiving speech input, and the step of generating the sidetone signal includes mixing a combination of the first microphone signal and the second microphone signal to recover high frequencies in the received speech input. In addition, in some embodiments, the step of determining a mode of operation includes: detecting speech based on at least one of the first microphone signal and the second microphone signal; and/or determining the mode of operation is a phone call mode when speech is detected. According to an embodiment, the determined mode of operation includes at least one of Phone Call, Speaker Recognition, and Speech Recognition.

In another embodiment, the controller is further configured to perform a step of generating the sidetone to improve voice characteristics including at least one of louder speech and enhanced signal-to-noise when the determined mode of operation is a phone call mode. The controller may also be configured to cancel bone conducted speech when the mode of operation is phone call. The controller may be further configured to perform at least one steps of: generate the sidetone based, at least in part, on a speaker recognition (SR) algorithm when no speech is detected; and generate the sidetone based, at least in part, on an automatic speech recognition (ASR) algorithm when no speech is detected and the audio signal is generated by an audio playback application.

According to an embodiment, the first microphone signal comprises speech input and the second microphone signal comprises in-ear audio, and the controller is further configured to perform steps including: comparing a frequency response of speech captured by the first microphone and the second microphone; tracking the compared frequency response over a period of time; and/or applying a compensation filter to minimize a difference of the frequency response of speech captured by the first microphone and the second microphone.

In some embodiments, the controller is further configured to generate the sidetone to compensate for an occlusion effect. The step of compensating for an occlusion effect may include processing sound to match a frequency response of the transducer to simulate a frequency response of an open ear.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
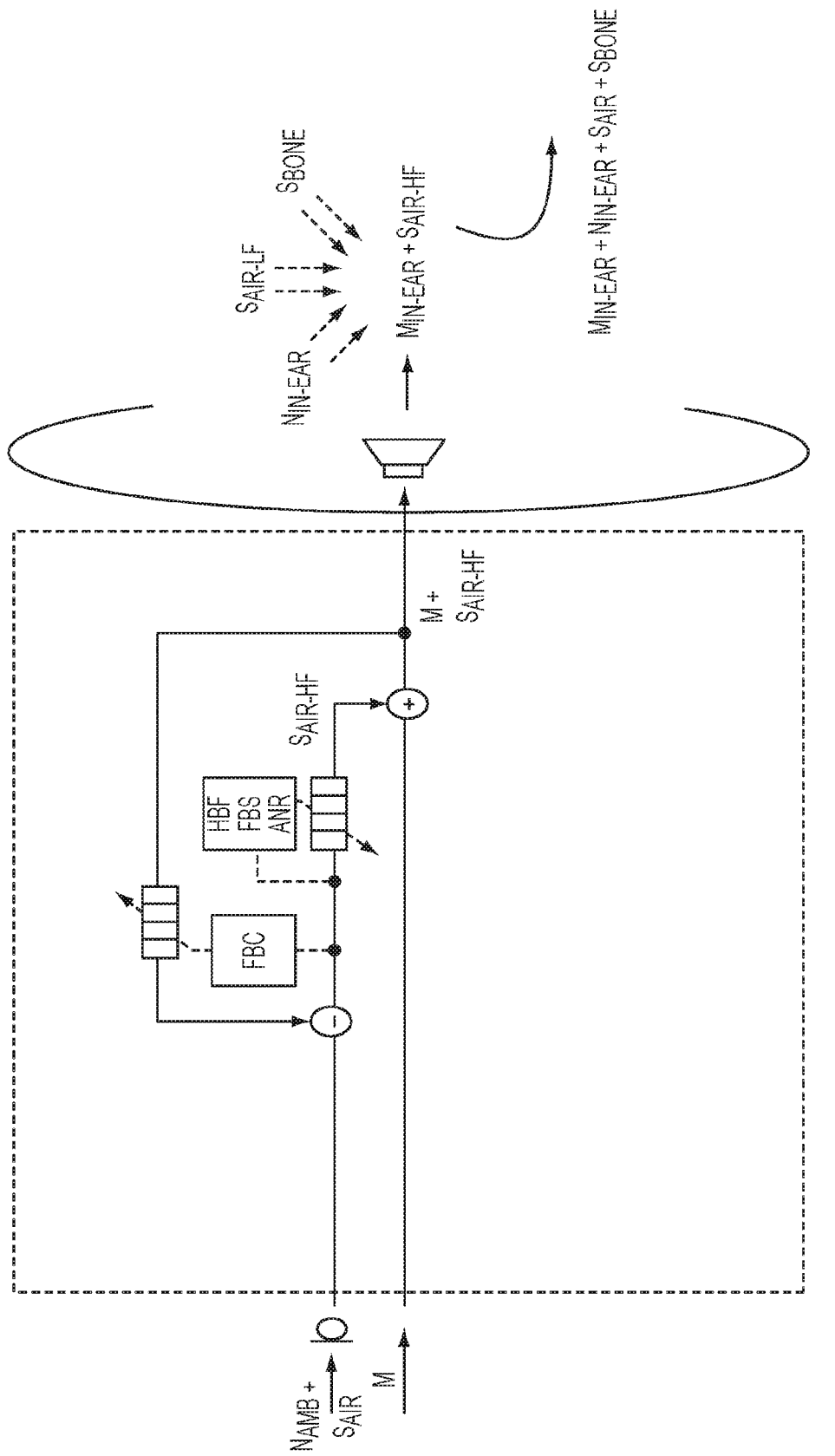
FIG. 1 is an example schematic block diagram illustrating a conventional sidetone generation system according to the prior art.

Sidetones described throughout this application may be used in personal audio devices, which may include one or more transducers such as a speaker. A personal audio device may be a wireless headphone, a wireless telephone, an Internet protocol (IP) or other telephone handset, a gaming headset, or a communications headset for aircraft, motorcycle, or automotive systems. The personal audio device may include a sidetone generation circuit that has one or more adjustable parameters that may be selected for the particular equipment, configuration, physical position, and/or ambient environment to improve users' perception of their own voice via the sidetone information. The selection may be performed dynamically in response to a user command or in response to a voice-activity detector (VAD) indicating whether or not near speech is present. Frequency shaping to generate the sidetone may be included in the form of low-pass, high-pass, and/or band-pass filtering of the user's speech and other captured audio. Frequency shaping may also include low-frequency cutoff filtering that compensates for a low-frequency enhancement provided by bone conduction from the transducer(s) to the inner ear.

The sidetone may be presented, along with playback audio, such as downlink audio, by a stereo headset. The stereo headset may include two monaural earphones, each having a speaker, for outputting the sidetone and playback audio. The stereo headset may also include a first microphone to capture the voice of the user and a second microphone to capture sounds reaching the user's ear. A sidetone-generating apparatus may operate on the signals generated by the microphones to select a sound level and frequency content of the user's voice that is heard by the user via feedback output to the speaker. Alternatively, instead of providing a microphone on each earphone to capture the voice of the user, the voice microphone may be a single microphone provided near the user's mouth, for example, on a boom or a lanyard. In another alternative embodiment, the sidetone may be presented by a wireless telephone having a transducer on the housing of the wireless telephone, and with a first microphone to capture the user's voice and a second microphone for capturing the output of the transducer to approximate the sound heard by the user's ear.

The sidetone-generating apparatus in any of the above configurations may be implemented with or without active noise cancellation (ANC) circuits, which can use the microphones to form part of the ambient noise and ANC error measurements. One or more of the parameters derived for ANC operation, such as a secondary-path response estimate, may be used in determining the gain and/or frequency response to be applied to the sidetone signal. Alternatively, or in combination, ambient noise reduction can be provided by the monaural earphones sealing the ear canal or sealing over the ear. The sidetone-generating apparatus may equalize the sound level of the user's voice as detected by the first and second microphones and may include an additional pre-set gain offset appropriate to the method of noise reduction and the position of the microphone that detects the sound reaching the user's ear. As yet another alternative, the sidetone-generating apparatus may equalize the sound level of the user's voice as detected by the first and second microphones and further allow for manual user control of gain offset in order to achieve the most desirable sidetone level.

Figure 2A:
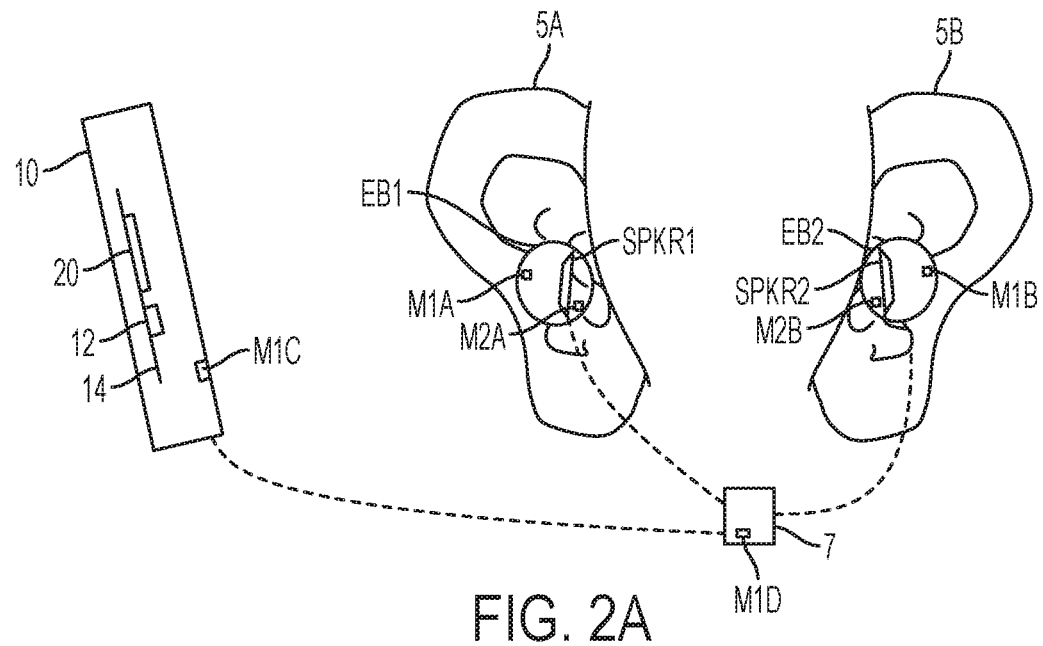
FIG. 2A is an example illustration of a personal audio system according to one embodiment of the disclosure.

FIG. 2A shows a wireless telephone 10 and a pair of earbuds EB1 and EB2, each inserted in a corresponding ear 5A, 5B of a listener. Illustrated wireless telephone 10 is an example of a device that may include a sidetone-generating apparatus, but it is understood that not all of the elements or configurations illustrated in wireless telephone 10, or in the circuits depicted in subsequent illustrations, are required. In particular, some or all of the circuits illustrated below as being within wireless telephone 10 may alternatively be implemented in a cord-mounted module that interconnects earbuds EB1, EB2 in a wired configuration, or implemented within earbuds EB1, EB2 themselves. Wireless telephone 10 may be connected to earbuds EB1, EB2 by a wired or wireless connection, e.g., a BLUETOOTH™ connection (BLUETOOTH is a trademark of Bluetooth SIG, Inc.). Each of the earbuds EB1 and EB2 may have a corresponding transducer, such as speakers SPKR1 and SPKR2, to reproduce audio, which may include distant speech received from wireless telephone 10, ringtones, stored audio program material, and a sidetone, which is an injection of near-end speech, i.e., the speech of the user of wireless telephone 10. The source audio may also include any other audio that wireless telephone 10 is required to reproduce, such as source audio from web-pages or other network communications received by wireless telephone 10 and audio indications such as battery low and other system event notifications.

First microphones M1A, M1B for receiving the speech of the user may be provided on a surface of the housing of respective earbuds EB1, EB2, may alternatively be mounted on a boom, or alternatively located within a cord-mounted module 7. In embodiments that include adaptive noise-canceling (ANC) as described below, first microphones M1A, M1B may also serve as reference microphones for measuring the ambient acoustic environment. Second microphones M2A, M2B may be provided in order to measure the audio reproduced by respective speakers SPKR1, SPKR2 close to corresponding ears 5A, 5B when earbuds EB1, EB2 are inserted in the outer portion of ears 5A, 5B so that the listener's perception of the sound reproduced by speakers SPKR1, SPKR2 can be more accurately modeled. In particular, the determination of the response of sidetone information as heard by the user is utilized in the circuits described below. Second microphones M2A, M2B may function as error microphones in embodiments that include ANC as described below, providing a measure of the ambient noise canceling performance of the ANC system in addition to estimating the sidetone as heard by the user.

Figure 2B:
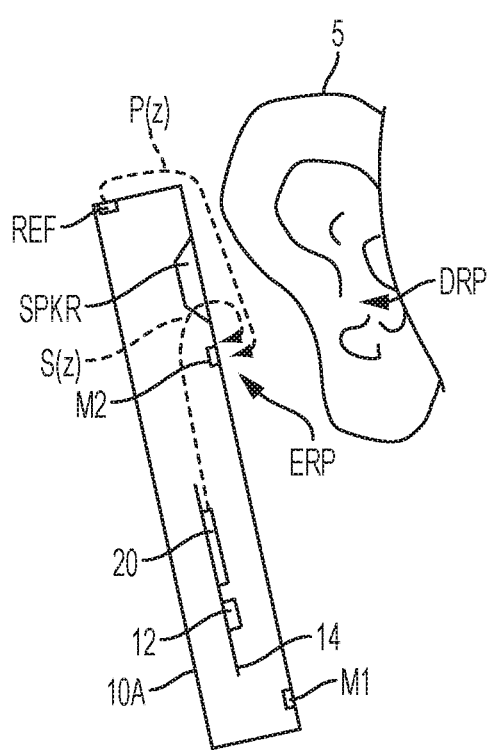
FIG. 2B is another example illustration of a personal audio system according to one embodiment of the disclosure.

Wireless telephone 10 includes circuits and features performing the sidetone generation as described below, in addition to optionally providing ANC functionality. A circuit 14 within wireless telephone 10 may include an audio integrated circuit 20 that receives the signals from first microphones M1A, M1B and second microphones M2A, M2B and interfaces with other integrated circuits such as an RF integrated circuit 12 containing the wireless telephone transceiver. An alternative location places a microphone M1C on the housing of wireless telephone 10 or a microphone M1D on cord-mounted module 7. In other implementations, the circuits and techniques disclosed herein may be incorporated in a single integrated circuit that contains control circuits and other functionality for implementing the entirety of the personal audio device, such as an MP3 player-on-a-chip integrated circuit or a wireless telephone implemented within a single one of earbuds EB1, EB2. In other embodiments, as illustrated in FIG. 2B below, a wireless telephone 10A includes the first and second microphones, the speaker, and the sidetone calibration. Equalization may be performed by an integrated circuit within wireless telephone 10. For the purposes of illustration, the sidetone circuits will be described as provided within wireless telephone 10, but the above variations are understandable by a person of ordinary skill in the art and the consequent signals that are required between earbuds EB1, EB2, wireless telephone 10, and a third module, if required, can be easily determined for those variations.

FIG. 2B shows an example wireless telephone 10A, which includes a speaker SPKR held in proximity to a human ear 5. Illustrated wireless telephone 10A is an example of a device that may include a sidetone-generating apparatus, but it is understood that not all of the elements or configurations embodied in illustrated wireless telephone 10A, or in the circuits depicted in subsequent illustrations, are required. Wireless telephone 10A includes a transducer, such as a speaker SPKR, that reproduces distant speech received by wireless telephone 10A along with other local audio events, such as ringtones, stored audio program material, near-end speech, sources from web-pages or other network communications received by wireless telephone 10, and audio indications, such as battery low and other system event notifications. A microphone M1 is provided to capture near-end speech, which is transmitted from wireless telephone 10A to the other conversation participant(s).

Wireless telephone 10A includes sidetone circuits that inject an anti-noise signal into speaker SPKR to improve intelligibility of the distant speech and other audio reproduced by speaker SPKR. Further, FIG. 2B illustrates various acoustic paths and points of reference that are also present in the system of FIG. 2A, but are illustrated only in FIG. 2B for clarity. Therefore, the discussion below is also applicable in the system of FIG. 2A and is understood to apply to earphone-based applications as well as housing-mounted-transducer applications. A second microphone, microphone M2, is provided in order to measure the audio reproduced by speaker SPKR close to ear 5, when wireless telephone 10 is in close proximity to ear 5, in order to perform sidetone calibration, and in ANC applications, to provide an error signal indicative of the ambient audio sounds as heard by the user. Ideally, the sidetone signal is optimized for the best frequency response and gain at a drum reference position DRP which represents the sound heard by the listener. Microphone M2 measures the audio at an error reference position ERP, and the sidetone can be calibrated to obtain a desired result at error reference position ERP. Fixed equalization can be used to adjust the sidetone response to optimize the sidetone present at drum reference position DRP, and to additionally compensate for bone conduction due to contact between earbuds EB1, EB2 in the system of FIG. 2A or contact with the housing of wireless telephone 10A in the system of FIG. 2B. Wireless telephone 10A also includes audio integrated circuit 20 that receives the signals from a reference microphone REF, microphone M1, and microphone M2 and interfaces with other integrated circuits such as RF integrated circuit 12. In other implementations, the circuits and techniques disclosed herein may be incorporated in a single integrated circuit that contains control circuits and other functionality for implementing the entirety of the personal audio device, such as an MP3 player-on-a-chip integrated circuit. A third microphone, reference microphone REF, is optionally provided for measuring the ambient acoustic environment in ANC application and is positioned away from the typical position of a user's mouth, so that the near-end speech is minimized in the signal produced by reference microphone REF. A primary acoustic path $P(z)$ illustrates the response that is modeled adaptively in an ANC system in order to cancel ambient acoustic noise at error reference position ERP, and a secondary electro-acoustic path $S(z)$ illustrates the response that is modeled in the instant disclosure for both sidetone equalization and for ANC operations that represents the transfer function from audio integrated circuit 20 through speaker SPKR and through microphone M2.

Figure 3:
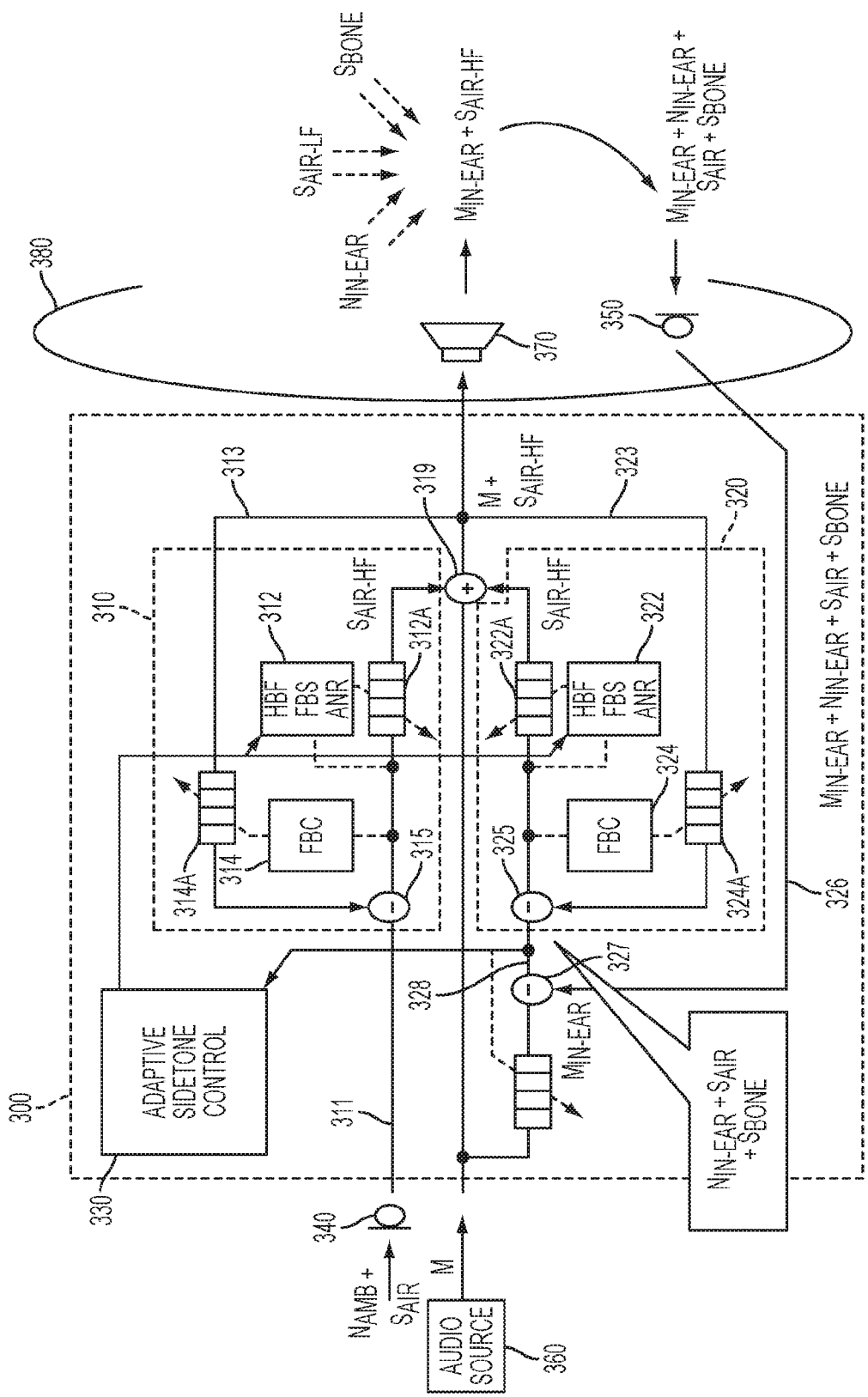
FIG. 3 is an example schematic block diagram illustrating a sidetone generation system according to one embodiment of the disclosure.

FIG. 3 is an example schematic block diagram illustrating a sidetone generation system according to one embodiment of the disclosure. Specifically, FIG. 3 illustrates a sidetone generation scheme which can be implemented in a personal audio device. For example, the sidetone generation system 300 may be implemented in audio integrated circuit 20 illustrated in FIGS. 2A and 2B. In some embodiments, sidetone generation system 300 may be implemented with or without adaptive noise cancellation.

Sidetone generation system 300 includes at least sidetone processing block 310, sidetone processing block 320, and adaptive sidetone control block 330. The sidetone generation system 300 may receive information from a first microphone 340, a second microphone 350, an audio source 360, and/or a transducer 370. Audio from the audio source 360 may include distant speech received by a personal audio device, such as wireless telephones 10 and 10A illustrated in FIGS. 2A and 2B, along with other local audio events, such as ringtones, stored audio program material, near-end speech, sources from web-pages or other network communications received by the personal audio device, and audio indications, such as low battery and other system event notifications. In some embodiments, first microphone 340 may correspond to any of microphones M1, M1C, or M1D illustrated in FIGS. 2A and 2B, and second microphone 350 may correspond to any of microphones M1A, M1B, M2A, M2B, or M2 illustrated in FIGS. 2A and 2B.

The sidetone generation system 300 may output an audio signal, such as an audio signal including audio from the audio source and a generated sidetone, to a transducer 370. As illustrated in FIG. 3, both the second microphone 350 and the transducer 370 may be in close proximity to a human ear 380. For example, the second microphone 350 and the transducer 370 may be located in an earphone, headphone, earbud, or other component capable of being placed in or around a human ear 380.

In operation, audio M from audio source 360 may be received by an audio processing block, such as sidetone generation block 300, which provides the audio to transducer 370 to be audibly reproduced for audible reception by a user's ear 380. Ideally, no processing of the received audio to enhance quality is necessary, and the human hears only the desired audio. However, the audible content received by a human's ear 380 includes more than the audio M from the audio source 360. For example, as illustrated in FIG. 3, a human ear 380 may hear undesired audio from other sources. FIG. 3 includes some undesirable audio typically heard by a human's ear 380, such as ambient noise $N_{in-ear}$ captured by ear 380, air-conducted speech made up of low frequency air-conducted speech component $S_{air-LF}$ and high frequency air-conducted speech component $S_{air-HF}$, and bone-conducted speech $S_{bone}$. The undesired audio may degrade the quality of the desired audio heard by the user, thus necessitating quality enhancement via audio processing, such as processing by a sidetone generation system 300.

A sidetone generation system 300 includes sidetone processing block 310, which may be used to generate a sidetone to improve the quality of the audio ultimately heard by the user. In particular, sidetone processing block 310 receives a first microphone signal 311 from first microphone 340. The first microphone signal 311 may include ambient noise $N_{AMB}$ and air-conducted speech $S_{air}$. In addition, sidetone processing block 310 may also receive a first feedback signal 313 from the transducer 370. The first feedback signal 313 may include residual feedback, such as any signal that is fed back to sidetone processing block 310 as a result of the electrical configuration of sidetone processing block 310 or other electrical components of sidetone generation system 300 and that is still present after feedback cancellation.

Sidetone processing block 310 may include a first processing block 312 to process the signals received by sidetone processing block 310. First processing block 312 may be configured to perform high-pass filtering (HPF), feedback suppression (FBS), and ambient noise reduction (ANR). Accordingly, sound captured from first microphone 340 may be processed by first processing block 312 to remove ambient noise $N_{AMB}$, boost high frequency speech that is passively attenuated before reaching the human's ear 380, and remove residual feedback still present in the signal. In some embodiments, first processing block 312 may include a minimum phase filter configured to perform some of its processing.

Sidetone processing block 310 may also include a second processing block 314 to process the signals received by sidetone processing block 310. The second processing block 314 may be configured to perform feedback cancellation so as to cancel as much of first feedback signal 313 as possible. In some embodiments, second processing block 314 may perform the feedback cancellation by generating a signal that gets subtracted from the first microphone signal 311, for example, by subtraction block 315, to cancel out as much feedback as possible from the transducer. The output of the subtraction block 315 may be received by the first processing block 312 to suppress some of the residual feedback still present in the signal.

Sidetone processing block 310 may also include memory elements. For example, sidetone processing block 310 includes a first memory element 312A for the storage of the results of the first processing block 312. In some embodiments, the first memory element 312A may not store the results of the first processing block 312, but may instead be capable of being manipulated by first processing block 312. Sidetone processing block 310 also includes a second memory element 314A for the storage of the results of the second processing block 314. Like the first memory element 312A, the second memory element 314A may not store the results of the second processing block 314, but may instead be capable of being manipulated by second processing block 314.

The sidetone generated by sidetone processing block 310, i.e., the signal that results after processing by sidetone processing block 310, may consist primarily of the boosted high-frequency speech $S_{air-HF}$. The sidetone $S_{air-HF}$ generated by sidetone processing block 310 may be subsequently combined with the audio signal M received from audio source 360 and the sidetone generated by sidetone processing block 320, for example, by adding, using addition block 319, the sidetone $S_{air-HF}$ to the audio signal M received from audio source 360 and the sidetone generated by sidetone processing block 320. The combined signal may be transferred to transducer 370 for audible reproduction.

As illustrated in FIG. 3, sidetone generation system 300 also includes sidetone processing block 320 to further improve the quality of the audio ultimately heard by the user. In particular, sidetone processing block 320 may be used to reduce the effects of bone-conducted speech $S_{bone}$ and ambient noise $N_{in-ear}$ captured by a human's ear 380 as well as to boost high frequency speech that is passively attenuated before reaching the human's ear 380.

In FIG. 3, sidetone processing block 320 receives a second feedback signal 323 from the transducer 370. The second feedback signal 323 may include residual feedback, such as any signal that is fed back to sidetone processing block 320 as a result of the electrical configuration of sidetone processing block 320 or other electrical components of sidetone generation system 300 and that is still present after feedback cancellation. However, rather than receiving a microphone signal from the first microphone like sidetone processing block 310, sidetone processing block 320 receives a second input signal 328 that is a combination of audio signal M from audio source 360 and a second microphone signal 326 received from second microphone 350. The second microphone signal 326 received from second microphone 350 may include audio signal $M_{in-ear}$ captured by a human's ear 380, ambient noise $N_{in-ear}$ captured by a human's ear 380, air-conducted speech $S_{air}$, and bone-conducted speech $S_{bone}$. At subtraction block 327, the audio signal $M_{in-ear}$ captured by a human's ear 380 may be subtracted from audio signal M to obtain a signal 328 that includes primarily $N_{in-ear}$, $S_{air}$, and $S_{bone}$. Signal 328 may be subsequently processed by sidetone processing block 320 to generate a sidetone to further improve the quality of the audio heard by the user.

Sidetone processing block 320 may include a first processing block 322 to process the signals received by sidetone processing block 320. First processing block 322 may be configured to perform high-pass filtering (HPF), feedback suppression (FBS), and ambient noise reduction (ANR). Accordingly, sound captured from first microphone 350 may be processed by first processing block 322 to remove $N_{in-ear}$, $S_{bone}$, and $S_{air-LF}$, boost high frequency speech that is passively attenuated before reaching the human's ear 380, and remove residual feedback still present in the signal. In some embodiments, first processing block 322 may include and employ a minimum phase filter to perform some of its processing.

Sidetone processing block 320 also includes a second processing block 324 to process the signals received by sidetone processing block 320. Specifically, second processing block 324 may be configured to perform feedback cancellation so as to cancel as much as possible of first feedback signal 323. In some embodiments, second processing block 324 may perform the feedback cancellation by generating a signal that gets subtracted from signal 328, for example, by subtraction block 327, to cancel out as much as possible feedback from the transducer. The output of the subtraction block 327 may be received by the first processing block 322 to suppress some of the residual feedback still present in the signal.

Sidetone processing block 320 may also include memory elements. For example, sidetone processing block 320 includes a first memory element 322A for the storage of the results of the first processing block 322. In some embodiments, the first memory element 322A may not store the results of the first processing block 322, but may instead be manipulated by first processing block 322. Sidetone processing block 320 also includes a second memory element 324A for the storage of the results of the second processing block 324. Like the first memory element 322A, the second memory element 324A may not store the results of the second processing block 324, but may instead be manipulated by second processing block 324.

As illustrated in FIG. 3, the sidetone generated by sidetone processing block 320, i.e., the signal that results after processing by sidetone processing block 320, may consist primarily of the boosted high-frequency speech $S_{air-HF}$. The sidetone $S_{air-HF}$ generated by sidetone processing block 320 may be subsequently combined with the audio signal M received from audio source 360 and the sidetone generated by sidetone processing block 310, for example, by adding, using addition block 319, the sidetone $S_{air-HF}$ to the audio signal M received from audio source 360 and the sidetone generated by sidetone processing block 310. The combined signal may be transferred to transducer 370 for audible reproduction.

As illustrated in FIG. 3, sidetone generation system 300 also includes adaptive sidetone control block 330. The adaptive sidetone control block 330 may be used to adapt sidetone processing blocks 310 and 320 to mix in a combination of signals from the first microphone 340 and the second microphone 350 to recover the high frequencies in a user's voice and generate an optimized sidetone. For example, as illustrated in FIG. 3, signal processing block 310 receives a first microphone signal 311 from first microphone 340 and signal processing block 320 receives a second input signal 328 that is a combination of audio signal M from audio source 360 and a second microphone signal 326 received from second microphone 350. The adaptive sidetone control block 330 may adapt sidetone processing block 310 and sidetone processing block 320 such that the majority of the sidetone $S_{air-HF}$ transferred to transducer 370 is provided by the sidetone $S_{air-HF}$ generated by sidetone processing block 310. In other embodiments, such as when there is a significant amount of noise or wind in the environment, the adaptive sidetone control block 330 may adapt sidetone processing block 310 and sidetone processing block 320 so that the majority of the sidetone $S_{air-HF}$ transferred to transducer 370 is provided by the sidetone $S_{air-HF}$ generated by sidetone processing block 320.

Adaptive sidetone control block 330 may determine how to balance the processing between sidetone processing block 310 and sidetone processing block 320 based on numerous factors, such as the mode in which the personal audio device is operating. In one embodiment, adaptive sidetone control block 330 may receive a first microphone signal from a first microphone, such as microphone 340, and a second microphone signal from a second microphone, such as microphone 350. Based on processing of the first microphone signal and the second microphone signal, adaptive sidetone control block 330 may determine a mode of operation of the personal audio device. For example, adaptive control block 330 may determine whether the personal audio device is operating in a Phone Call, Speaker Recognition, and/or Speech Recognition mode. The adaptive sidetone control block 330 may detect speech based on at least one of the first microphone signal and the second microphone signal, and then determine that the mode of operation is Phone Call mode when speech is detected. Based on the determined mode of operation, adaptive control block 330 may adapt sidetone processing blocks 310 and 320 to mix in a combination of signals from the first microphone 340 and the second microphone 350 to generate an optimized sidetone signal based, at least in part, on the first microphone signal and the second microphone signal and the determined mode of operation.

The adaptive sidetone control block 330 may adapt the processing of sidetone processing blocks 310 and 320 based on audio recognition algorithms. For example, sidetone generation system 300 may generate the sidetone that gets transferred to transducer 370 along with audio signal M from audio source 360 based, at least in part, on a speaker recognition (SR) algorithm. According to one embodiment, sidetone generation may be based on an SR algorithm when no speech is detected. In another embodiment, sidetone generation system 300 may generate the sidetone that gets transferred to transducer 370 along with audio signal M from audio source 360 based, at least in part, on an automatic speech recognition (ASR) algorithm. For example, sidetone generation may be based on an ASR algorithm when no speech is detected and the audio signal is generated by an audio playback application.

The adaptive sidetone control block 330 may also be configured to monitor the frequency of received speech signals and adapt sidetone processing blocks 310 and 320 to generate an optimized sidetone signal. For example, the first microphone signal 311 may include speech input and the second microphone signal 326 may include in-ear audio. In such embodiments, adaptive sidetone control block 330 may be configured to compare a frequency response of speech captured by the first microphone and the second microphone and to track the compared frequency response over a period of time. Adaptive sidetone control block 330 may then adapt sidetone processing blocks 310 and 320 to apply compensation filtering to minimize a difference of the frequency response of speech captured by the first microphone and the second microphone.

The adaptive sidetone control block 330 may also be configured to receive the mode of operation of the personal audio device. For example, another component of the personal audio device, such as an application processor, which may also include a voice-activity detector (VAD), may also receive a first microphone signal from a first microphone and a second microphone signal from a second microphone and determine, based on processing of the first microphone signal and the second microphone signal, the mode of operation of the personal audio device. For example, a component of the personal audio device, such as audio integrated circuit 20 illustrated in FIGS. 2A and 2B or a component including audio integrated circuit 20 illustrated in FIGS. 2A and 2B, may detect speech based on at least one of the first microphone signal and the second microphone signal, and then determine that the mode of operation is Phone Call mode when speech is detected. In some embodiments, the other component of the personal audio device which determines the mode of operation may also determine the mode of operation based on processing of information that does not include the first and/or second microphone signals. For example, the mode of operation may be determined by a component of the personal audio device based on input provided by a user. Regardless of how a component of personal audio device determines the mode of operation, adaptive sidetone control block 330 may subsequently be informed of the mode of operation. Based on the received mode of operation, adaptive sidetone control block 330 may adapt sidetone processing blocks 310 and 320 to mix in a combination of signals from the first microphone 340 and the second microphone 350 to generate an optimized sidetone signal based, at least in part, on the first microphone signal and the second microphone signal and the received mode of operation.

In addition to receiving an indication of the mode of operation of the audio device, adaptive sidetone control block 330 may also receive instructions from another component of the personal audio device. For example, a component of the personal audio device, such as audio integrated circuit 20 illustrated in FIGS. 2A and 2B or a component including audio integrated circuit 20 illustrated in FIGS. 2A and 2B, may receive the first microphone signal 311 that includes speech input and the second microphone signal 326 that includes in-ear audio. In such embodiments, the component may compare a frequency response of speech captured by the first microphone and the second microphone and to track the compared frequency response over a period of time. Adaptive sidetone control block 330 may then be informed of the results of the comparing and tracking and instructed to adapt sidetone processing blocks 310 and 320 to apply compensation filtering to minimize a difference of the frequency response of speech captured by the first microphone and the second microphone.

Figure 4:
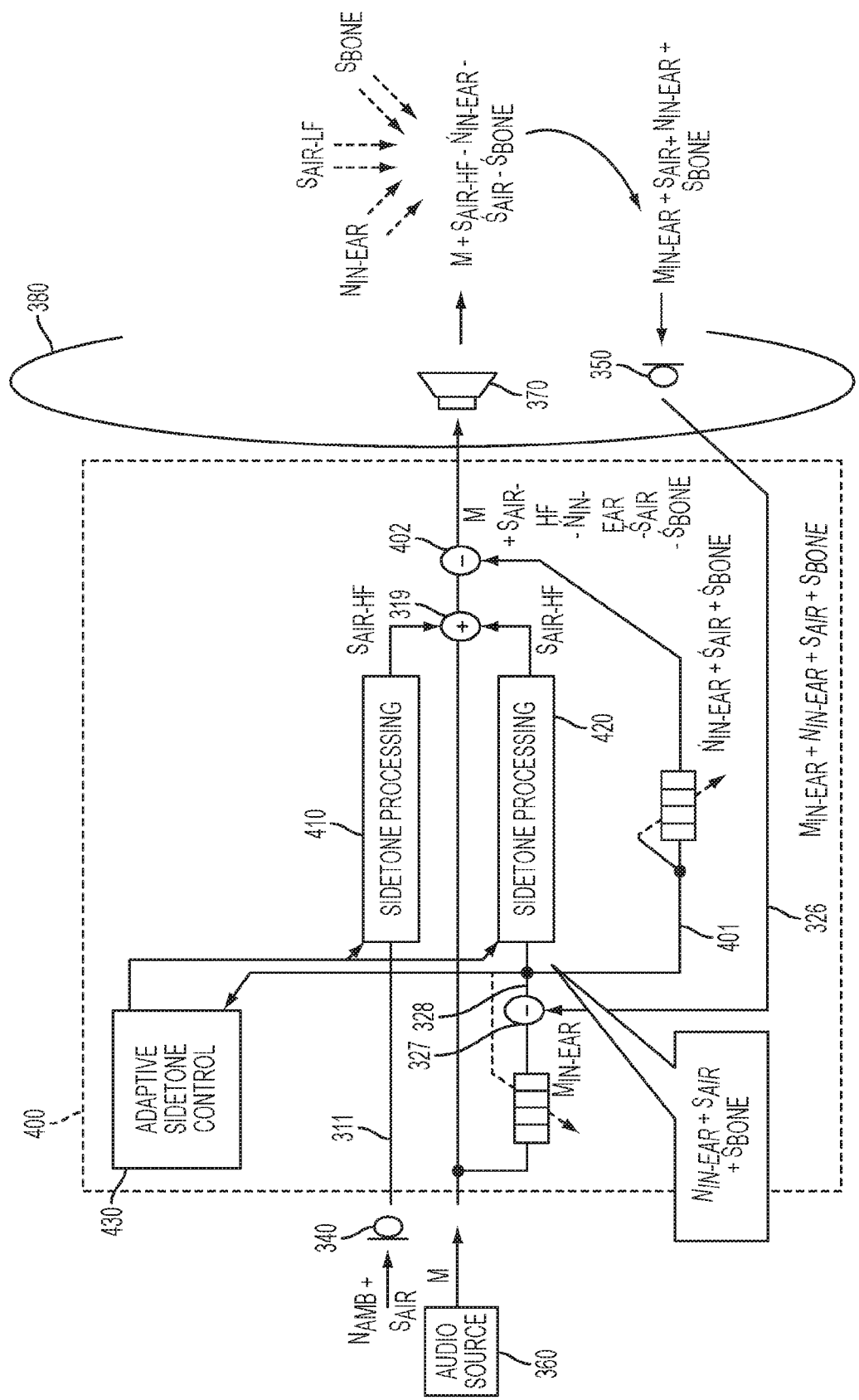
FIG. 4 is an example schematic block diagram illustrating another sidetone generation system according to one embodiment of the disclosure.

FIG. 4 is an example schematic block diagram illustrating another sidetone generation system according to one embodiment of the disclosure. Specifically, FIG. 4 illustrates a sidetone generation scheme that can be implemented in a personal audio device. For example, the sidetone generation system 400 may be implemented in audio integrated circuit 20 illustrated in FIGS. 2A and 2B. In some embodiments, sidetone generation system 400 may be implemented with or without adaptive noise cancellation.

Sidetone generation system 400 may be similar to sidetone generation system 300. For example, like sidetone generation system 300, sidetone generation system 400 includes at least sidetone processing block 410, sidetone processing block 420, and adaptive sidetone control block 430. The sidetone generation system 400 may receive information from at least the first microphone 340, the second microphone 350, and the audio source 360. The sidetone generation system 400 may output an audio signal, such as an audio signal including audio signal M from the audio source 360 and a generated sidetone, to a transducer 370.

Sidetone generation system 400 includes sidetone processing blocks 410 and 420. In some embodiments, sidetone processing blocks 410 and 420 may perform the same functions as sidetone processing blocks 310 and 320 illustrated in FIG. 3 with the exception that sidetone processing blocks 410 and 420 may forego reception of and processing of feedback signals from the transducer, such as feedback signal 313 or feedback signal 323 illustrated in FIG. 3.

FIG. 4 illustrates additional features that may be incorporated into a sidetone generation system to generate optimized sidetones to further improve the quality of the audio heard by a user. For example, a feed forward path 401 may be included through which undesired audio heard by a user may be canceled. The undesired audio that may be canceled or reduced in magnitude may include at least bone-conducted speech $S_{bone}$, ambient noise $N_{in-ear}$ captured by a human's ear 380, and low frequency speech $S_{air-LF}$ that may have been amplified before reaching the human's ear 380.

The sidetone processing block 420 receives a second input signal 328 that is a combination of audio signal M from audio source 360 and a second microphone signal 326 received from second microphone 350. The second microphone signal 326 received from second microphone 350 may include audio signal $M_{in-ear}$ captured by a human's ear 380, ambient noise $N_{in-ear}$ captured by a human's ear 380, air-conducted speech $S_{air}$, and bone-conducted speech $S_{bone}$. At subtraction block 327, the audio signal $M_{in-ear}$ captured by a human's ear 380 may be subtracted from audio signal M to obtain a signal 328 that includes primarily $N_{in-ear}$, $S_{air}$, and $S_{bone}$. Signal 328 may be subsequently processed by sidetone processing block 320 to generate a sidetone to further improve the quality of the audio heard by the user.

Signal 328, which includes $N_{in-ear}$, $S_{air}$, and $S_{bone}$, may also be fed forward and combined with the signal being transferred to transducer 370 in order to directly cancel the undesired audio consisting of $N_{in-ear}$, $S_{air}$, and $S_{bone}$ heard by the user. For example, after sidetone processing blocks 410 and 420 output their sidetone signals to be combined with the audio M from audio source 360 at addition block 319, the signal 328 may be fed forward via feed forward path 401 to subtraction block 402. Specifically, at subtraction block 402, signal 328 including $N_{in-ear}$, $S_{air}$, and $S_{bone}$ may be subtracted from the combined signal including the sidetone signals generated by signal processing blocks 410 and 420 to be combined with the audio M from audio source 360 to obtain a final signal to be transferred to transducer 370 for audible reproduction.

Adaptive sidetone control block 430 may operate similar to adaptive sidetone control block 330. However, adaptive sidetone control block 430 may include the additional feature of processing signal 328 to further optimize the processing by sidetone processing blocks 410 and 420 to generate an optimized sidetone signal. In other words, adaptive sidetone control block 430 may receive signal 328, which includes $N_{in-ear}$, $S_{air}$, and $S_{bone}$, and, based on processing of signal 328, adapt sidetone processing blocks 410 and 420 to mix in a combination of signals from the first microphone 340 and the second microphone 350 to generate an optimized sidetone signal. For example, based on the processing of signal 328, adaptive control block 430 may determine that the high frequency speech signals $S_{air-HF}$ output by one or both of the signal processing blocks 410 and 420 may need to be further amplified and thus instructing signal processing blocks 410 and 420 to further amplify the high frequency speech signals $S_{air-HF}$ they output.

Figure 5:
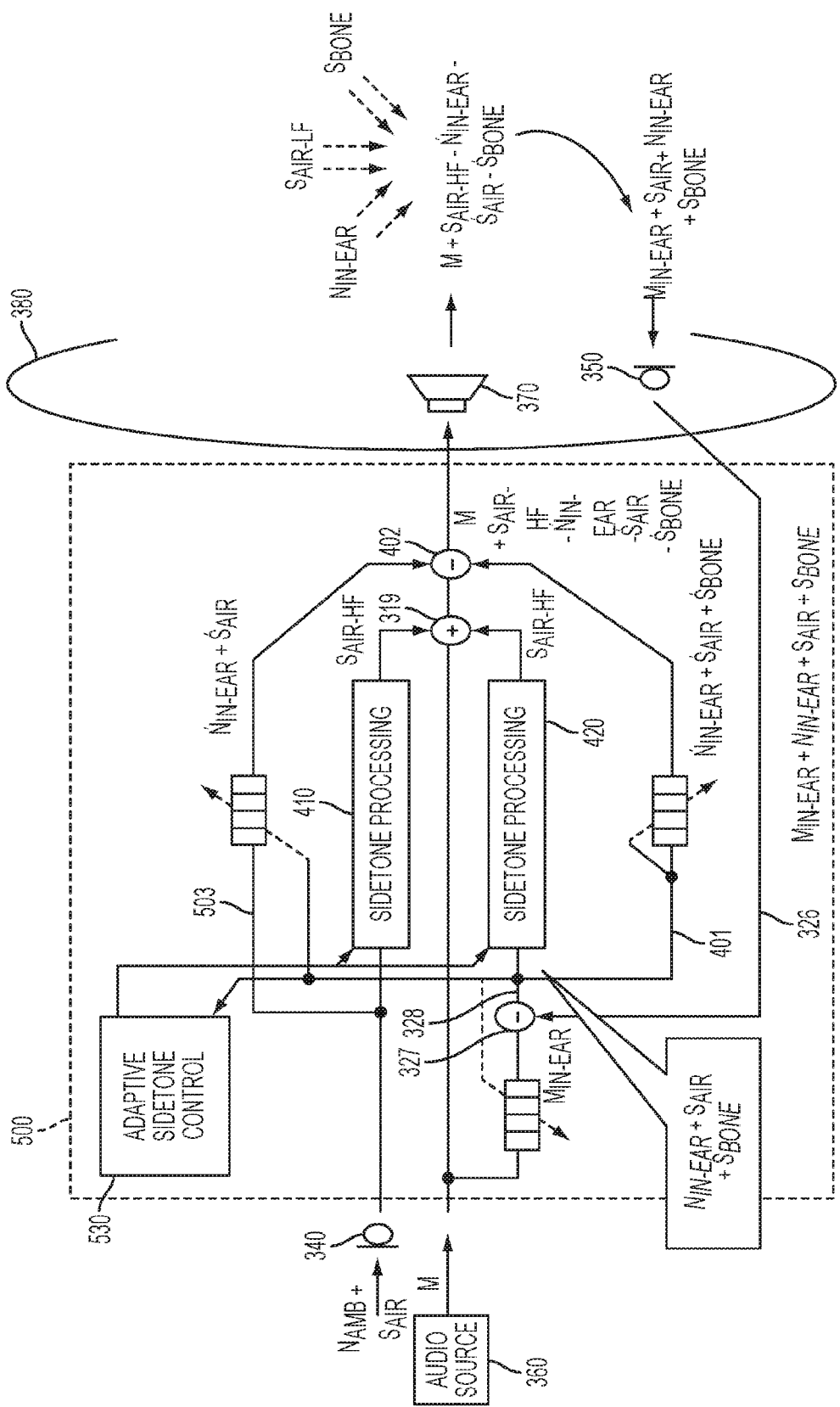
FIG. 5 is an example schematic block diagram illustrating another sidetone generation system according to one embodiment of the disclosure.

FIG. 5 is an example schematic block diagram illustrating another sidetone generation system according to one embodiment of the disclosure. Specifically, FIG. 5 illustrates a sidetone generation scheme that can be implemented in a personal audio device. For example, the sidetone generation system 500 may be implemented in audio integrated circuit 20 illustrated in FIGS. 2A and 2B. In some embodiments, sidetone generation system 500 may be implemented with or without adaptive noise cancellation.

Sidetone generation system 500 is similar to sidetone generation system 400, but includes additional features that may be incorporated into a sidetone generation system to generate optimized sidetones to further improve the quality of the audio heard by a user. For example, FIG. 5 illustrates another feed forward path 503 through which undesired audio heard by a user may be further canceled. The additional undesired audio which may be canceled or reduced in magnitude may include at least ambient noise $N_{in-ear}$ captured by a human's ear 380, and low frequency speech $S_{air-LF}$ that may have been amplified before reaching the human's ear 380.

Some components of signal 328, such as $N_{in-ear}$ and $S_{air}$, may also be fed forward and combined with the signal being transferred to transducer 370 in order to further directly cancel the undesired audio consisting of $N_{in-ear}$ and $S_{air}$ heard by the user. For example, as illustrated in FIG. 4, after sidetone processing blocks 410 and 420 output their sidetone signals to be combined with the audio M from audio source 360 at addition block 319, the signal 328 may be fed forward via feed forward path 401 to subtraction block 402. FIG. 5 illustrates that $N_{in-ear}$ and $S_{air}$ may also be fed forward to subtraction block 402 via feed forward path 503 to further subtract $N_{in-ear}$ and $S_{air}$ from the signal that reaches transducer 370. Specifically, at subtraction block 402, signal 328 including $N_{in-ear}$, $S_{air}$, and $S_{bone}$ fed forward via feed forward path 401 and signal components $N_{in-ear}$ and $S_{air}$ fed forward via feed forward path 503 may be subtracted from the combined signal including the sidetone signals generated by signal processing blocks 410 and 420 to be combined with the audio M from audio source 360 to obtain a final signal to be transferred to transducer 370 for audible reproduction.

As with adaptive sidetone control block 430 illustrated in FIG. 4, adaptive sidetone control block 530 illustrated in FIG. 5 may also include the additional feature of processing signal 328 to further optimize the processing by sidetone processing blocks 410 and 420 to generate an optimized sidetone signal. In other words, adaptive sidetone control block 530 may receive signal 328, which includes $N_{in-ear}$, $S_{air}$, and $S_{bone}$, and, based on processing of signal 328, adapt sidetone processing blocks 410 and 420 to mix in a combination of signals from the first microphone 340 and the second microphone 350 to generate an optimized sidetone signal.

Selection and optimization of sidetones generated for audio signal enhancement may be effectuated by a combination of the schemes illustrated in FIGS. 3-5. In other words, FIGS. 3-5 illustrate different features of a sidetone generation system which may be configured to perform any one of the adaptation schemes illustrated in FIGS. 3-5. For example, a sidetone generation system may be configured to use an adaptive sidetone control block to adapt sidetone processing blocks in accordance with the manner in which sidetone processing blocks 310 and 320 are adapted in FIG. 3. In another example, the sidetone generation system may use an adaptive sidetone control block to adapt sidetone processing blocks in accordance with the manner in which sidetone processing blocks 410 and 420 are adapted in FIG. 4 or 5 utilizing either scheme illustrated in FIG. 4 or 5.

The foregoing adaptation may be based on numerous factors. For example, as disclosed throughout this specification, adaptation may be based on the mode of operation in which the audio device is operating. In particular, each mode of operation may be optimized utilizing different signal enhancement features. For example, in one mode, speech enhancement may be the primary feature to be optimized. In another mode, ambient noise cancellation may be the primary feature to be optimized. Accordingly, a sidetone generation system may use any of the sidetone generation schemes described above to optimize the generation of sidetones for a particular mode in which an audio device is operating.

In view of the systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
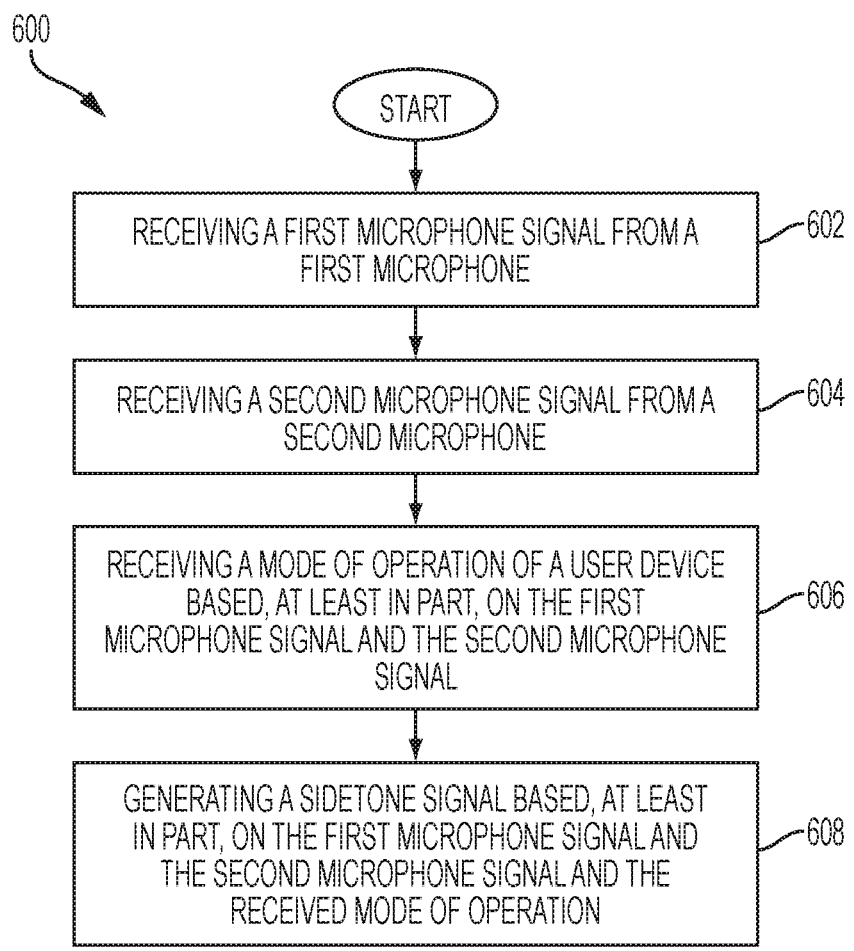
FIG. 6 is an example flow chart illustrating a method for frequency-dependent sidetone generation in personal audio devices according to one embodiment of the disclosure.

FIG. 6 is an example flow chart illustrating a method for frequency-dependent sidetone generation in personal audio devices according to one embodiment of the disclosure. Method 600 may be implemented with the systems described with respect to FIGS. 2-5. Method 600 includes, at block 602, receiving a first microphone signal from a first microphone, and, at block 604, receiving a second microphone signal from a second microphone. In some embodiments, receiving the first microphone signal, such as at block 602, may include receiving speech input.

Method 600 includes, at block 606, receiving a mode of operation of a user device. The modes of operation may include a Phone Call, Speaker Recognition, and/or Speech Recognition modes. In some embodiments, receiving the mode of operation may include detecting speech based on at least one of the first microphone signal and the second microphone signal, and then determining that the mode of operation is Phone Call mode when speech is detected.

Method 600 includes, at block 608, generating a sidetone signal based, at least in part, on the first microphone signal and the second microphone signal and the received mode of operation. For example, a sidetone generation system may generate the sidetone based, at least in part, on a speaker recognition (SR) algorithm when no speech is detected. In another embodiment, a sidetone generation system may generate the sidetone based, at least in part, on an automatic speech recognition (ASR) algorithm when no speech is detected and the audio signal is generated by an audio playback application. In some embodiments, generating the sidetone signal may include mixing a combination of the first microphone signal and the second microphone signal to recover high frequencies in the received speech input.

After the sidetone has been generated, it may be combined with an audio signal and transferred to a transducer. Upon reception, the transducer may reproduce the combined audio signal and sidetone signal, yielding higher quality audio and improved user experience for consumer devices, such as personal audio players and mobile phones.

Generating a sidetone, such as at block 608, may enhance the quality of the audio heard by a user. For example, generating the sidetone may improve voice characteristics including at least one of louder speech and enhanced signal-to-noise when the received and/or determined mode of operation is Phone Call mode. In one embodiment, the sidetone generation system may yield such improvements by cancelling bone-conducted speech when the mode of operation is Phone Call mode. In another embodiment, generating the sidetone may also compensate for an occlusion effect. Compensating for an occlusion effect may include processing sound to match a frequency response of the transducer to simulate a frequency response of an open ear.

In some embodiments, the first microphone signal may include speech input, such as speech input obtained via microphone 340 illustrated in FIGS. 3-5, and the second microphone signal may include in-ear audio, such as audio obtained via microphone 350 illustrated in FIGS. 3-5. In such embodiments, a sidetone generation system, or a processing block in communication with the sidetone generation system, may be configured to compare a frequency response of speech captured by the first microphone and the second microphone and to track the compared frequency response over a period of time. Based on the comparison and tracking, the sidetone generation system may be configured to apply compensation filtering to minimize a difference of the frequency response of speech captured by the first microphone and the second microphone, as discussed above with respect to adaptive sidetone control block 330.

Figure 7:
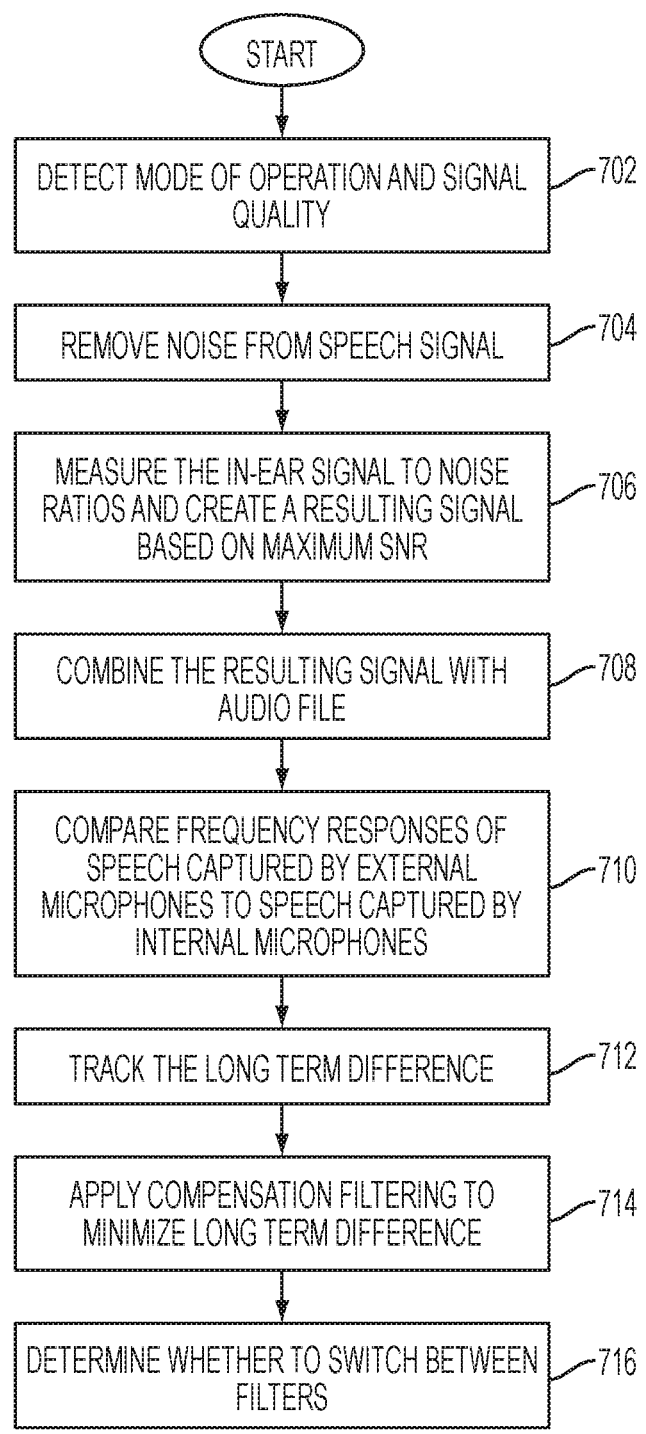
FIG. 7 is an example flow chart illustrating another method for frequency-dependent sidetone generation in personal audio devices according to one embodiment of the disclosure.

FIG. 7 is an example flow chart illustrating another method for frequency-dependent sidetone generation in personal audio devices according to one embodiment of the disclosure. Method 700 may be implemented with the systems described with respect to FIGS. 2-5. In some embodiments, method 700 may be implemented with or without adaptive noise cancellation. Method 700 includes, at block 702 detecting the mode of operation and signal quality associated with a use of an audio device. For example, the mode of operation may be detected by an adaptive sidetone control block, or other processing component of an audio device, as discussed with reference to block 606 illustrated in FIG. 6. According to an embodiment, the step of detecting may include detecting when someone is talking with a reasonable signal-to-noise ratio (SNR). In some embodiments, the detection may be based on microphone signals, such as signals from microphones on either ear, which may provide high correlation, microphones in an ear, or microphones on the personal audio device. According to another embodiment, the signals from a microphone in an ear may be received prior to cancellation.

At block 704, method 700 includes removing noise from a speech signal. In particular, the noise may be removed from a speech signal captured from a combination of microphones not in an ear piece and microphones in an ear piece. For example, noise may be removed utilizing any one of the sidetone generation systems 300, 400, or 500. According to one embodiment, the removal of noise may be accomplished using an ultra-low delay (ULD) filter.

At block 706, method 700 includes measuring the in-ear SNRs and creating a resulting signal based on a maximum SNR. For example, the ratio of the in-ear signal to noise may be measured for each microphone in close proximity to each ear, such as for each microphone in an ear piece. The signals may be processed to create higher-quality signals based on the maximum SNR. In other words, the amount of improvement in the signal quality may be limited by the maximum attainable SNR. In some embodiments, the measuring may be performed by an adaptive sidetone control block disclosed herein or other processing component of an audio device in communication with a sidetone generation system disclosed herein. At block 708, the resulting signal may be combined with an audio file, such as a media file, and transferred to a transducer for audible reproduction. For example, the resulting signal may be combined with the audio file in a manner similar to the manner in which resulting signals from sidetone processing blocks illustrated in FIGS. 3-5 are combined with media signals, in which the signals are combined using addition block 319.

Method 700 may proceed to block 710, wherein the frequency responses of speech captured by external microphones may be compared to speech captured by internal microphones. For example, the comparison may be performed by an in-ear monitor (IEM) after cancellation of media audio. In addition to comparing the frequency responses, the compared frequency response may be tracked over a period of time, such as at block 712. At block 714, a compensation filter may be utilized to minimize the difference between the frequency responses of the captured speech signals as indicated by the comparison performed at block 710. In some embodiments, the comparison, tracking, and compensation filtering may be performed by a sidetone generation system described above, such as a combination of one or more of sidetone generation systems 300, 400, and 500.

At block 716, method 700 may include determining whether to switch between filters. For example, a sidetone generation system may determine the mode in which the audio device is operating, such as by performing the determination step at block 702 or receiving an indication of the mode of operation. If the system determines that the device is in an ambient listening mode and that the compensation scheme currently being utilized for sidetone generation is optimizing audio processing for voice correction, which is different than optimization required for an ambient listening mode, the sidetone generation system may switch the processing performed by filters within the sidetone generation system to optimize the generated sidetones for an ambient listening mode.

The schematic flow chart diagrams of FIGS. 6 and 7 are generally set forth as a logical flow chart diagrams. As such, the depicted orders and labeled steps are indicative of aspects of the disclosed methods. Other steps and methods may be conceived that are equivalent in function, logic, or effect to one or more steps, or portions thereof, of the illustrated methods. Additionally, the formats and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
   a first microphone configured to generate a first microphone signal;
   a second microphone configured to generate a second microphone signal;
   a sidetone circuit configured to perform steps comprising:
      receiving a mode of operation; and
      generating a sidetone signal based, at least in part, on the first microphone signal and the second microphone signal and the received mode of operation,
      wherein the received mode of operation comprises at least one of phone call, speaker recognition, and automatic speech recognition modes, and
      wherein the first microphone is configured to receive speech input, and wherein the sidetone circuit is configured to generate the sidetone signal by mixing a combination of the first microphone signal and the second microphone signal to recover high frequencies in the received speech input; and
   a transducer for reproducing an audio signal and the sidetone signal.

2. The apparatus of claim 1, wherein the sidetone circuit is further configured:
   to detect speech based on at least one of the first microphone signal and the second microphone signal; and
   to determine that the mode of operation is the phone call mode when speech is detected.

3. The apparatus of claim 2, wherein the sidetone circuit is configured to generate the sidetone to improve voice characteristics including at least one of louder speech and enhanced signal-to-noise when the received mode of operation is the phone call mode.

4. The apparatus of claim 2, wherein the sidetone circuit is further configured to:
   generate the sidetone based, at least in part, on an automatic speech recognition (ASR) algorithm when no speech is detected and the audio signal is generated by an audio playback application; and
   otherwise, generate the sidetone based, at least in part, on a speaker recognition (SR) algorithm when no speech is detected.

5. The apparatus of claim 1, wherein the sidetone circuit is further configured to cancel bone conducted speech in an output of the transducer when the mode of operation is the phone call mode.

6. The apparatus of claim 5, wherein the sidetone circuit is further configured to cancel low frequency air conducted speech.

7. An apparatus, comprising:
   a first microphone configured to generate a first microphone signal;
   a second microphone configured to generate a second microphone signal,
   wherein the first microphone is configured to receive speech input and wherein the second microphone is configured to receive in-ear audio;
   a sidetone circuit configured to perform steps comprising:
      receiving a mode of operation; and
      generating a sidetone signal based, at least in part, on the first microphone signal and the second microphone signal and the received mode of operation, and
   wherein the sidetone circuit is further configured to:
      compare a frequency response of speech captured by the first microphone and the second microphone;
      track the compared frequency response over a period of time; and
      apply a compensation filter to reduce a difference of the frequency response of speech captured by the first microphone and the second microphone; and
   a transducer for reproducing an audio signal and the sidetone signal.

8. An apparatus, comprising:
   a first microphone configured to generate a first microphone signal;
   a second microphone configured to generate a second microphone signal;
   a transducer for reproducing an audio signal and the sidetone signal; and
   a sidetone circuit configured to perform steps comprising:
      receiving a mode of operation; and
      generating the sidetone signal based, at least in part, on the first microphone signal and the second microphone signal and the received mode of operation,
      wherein the sidetone circuit is configured to compensate for an occlusion effect by processing sound to match a frequency response of the transducer to simulate a frequency response of an open ear.

9. A method, comprising:
   receiving a first microphone signal from a first microphone;
   receiving a second microphone signal from a second microphone;
   receiving a mode of operation of a user device; and
   generating a sidetone signal based, at least in part, on the first microphone signal and the second microphone signal and the received mode of operation,
   wherein receiving the first microphone signal comprises receiving speech input, and wherein the step of generating the sidetone signal comprises mixing a combination of the first microphone signal and the second microphone signal to recover high frequencies in the received speech input.

10. The method of claim 9, further comprising reproducing, at a transducer, a combination of an audio signal and the sidetone signal.

11. The method of claim 9, wherein the received mode of operation comprises at least one of phone call, speaker recognition, and speech recognition modes.

12. The method of claim 9, wherein the step of receiving the mode of operation comprises:
   detecting speech based on at least one of the first microphone signal and the second microphone signal; and
   determining the mode of operation is the phone call mode when speech is detected.

13. The method of claim 12, further comprising generating the sidetone to improve voice characteristics including at least one of louder speech and enhanced signal-to-noise when the received mode of operation is the phone call mode.

14. The method of claim 13, further comprising at least one of:
   generate the sidetone based, at least in part, on a speaker recognition (SR) algorithm when no speech is detected; and
   generate the sidetone based, at least in part, on an automatic speech recognition (ASR) algorithm when no speech is detected and the audio signal is generated by an audio playback application.

15. The method of claim 9, further comprising cancelling bone conducted speech when the mode of operation is phone call.

16. A method, comprising:
   receiving a first microphone signal from a first microphone;
   receiving a second microphone signal from a second microphone;
   receiving a mode of operation of a user device; and
   generating a sidetone signal based, at least in part, on the first microphone signal and the second microphone signal and the received mode of operation,
   wherein the first microphone signal comprises speech input and the second microphone signal comprises in-ear audio, the method further comprising:
      comparing a frequency response of speech captured by the first microphone and the second microphone;
      tracking the compared frequency response over a period of time; and
      applying a compensation filter to reduce a difference of the frequency response of speech captured by the first microphone and the second microphone.

17. A method, comprising:
   receiving a first microphone signal from a first microphone;
   receiving a second microphone signal from a second microphone;
   receiving a mode of operation of a user device; and
   generating a sidetone signal based, at least in part, on the first microphone signal and the second microphone signal and the received mode of operation,
   wherein the step of generating the sidetone signal comprises compensating for an occlusion effect comprises processing sound to match a frequency response of the transducer to simulate a frequency response of an open ear.

18. An apparatus, comprising:
   a controller configured to perform steps comprising:
      receiving a first microphone signal from a first microphone;
      receiving a second microphone signal from a second microphone;
      determining a mode of operation of a user device; and
      generating a sidetone signal based, at least in part, on the first microphone signal and the second microphone signal and the determined mode of operation,
   wherein receiving the first microphone signal comprises receiving speech input, and
   wherein the step of generating the sidetone signal comprises mixing a combination of the first microphone signal and the second microphone signal to recover high frequencies in the received speech input.

19. The apparatus of claim 18, wherein the controller is further configured to perform the step of causing reproduction, at a transducer, of a combination of an audio signal and the sidetone signal.

20. The apparatus of claim 18, wherein the determined mode of operation comprises at least one of phone call, speaker recognition, and speech recognition modes.

21. The apparatus of claim 18, wherein the step of determining a mode of operation comprises:
   detecting speech based on at least one of the first microphone signal and the second microphone signal; and
   determining the mode of operation is the phone call mode when speech is detected.

22. The apparatus of claim 21, wherein the controller is further configured to perform a step of generating the sidetone to improve voice characteristics including at least one of louder speech and enhanced signal-to-noise when the determined mode of operation is the phone call mode.

23. The apparatus of claim 22, wherein the controller is further configured to perform at least one step of:
   generate the sidetone based, at least in part, on a speaker recognition (SR) algorithm when no speech is detected; and
   generate the sidetone based, at least in part, on an automatic speech recognition (ASR) algorithm when no speech is detected and the audio signal is generated by an audio playback application.

24. The apparatus of claim 18, wherein the controller is further configured to cancel bone conducted speech when the mode of operation is the phone call mode.

25. An apparatus, comprising:
   a controller configured to perform steps comprising:
      receiving a first microphone signal from a first microphone;
      receiving a second microphone signal from a second microphone;
      determining a mode of operation of a user device; and
      generating a sidetone signal based, at least in part, on the first microphone signal and the second microphone signal and the determined mode of operation,
   wherein the first microphone signal comprises speech input and the second microphone signal comprises in-ear audio,
   and wherein the controller is further configured to perform steps comprising:
      comparing a frequency response of speech captured by the first microphone and the second microphone;
      tracking the compared frequency response over a period of time; and
      applying a compensation filter to reduce a difference of the frequency response of speech captured by the first microphone and the second microphone.

26. An apparatus, comprising:
   a controller configured to perform steps comprising:
      receiving a first microphone signal from a first microphone;

receiving a second microphone signal from a second microphone;
determining a mode of operation of a user device; and
generating a sidetone signal based, at least in part, on the first microphone signal and the second microphone signal and the determined mode of operation to compensate for an occlusion effect,
wherein the step of generating a sidetone to compensate for an occlusion effect comprises processing sound to match a frequency response of the transducer to simulate a frequency response of an open ear.

* * * * *